United States Patent
Bruck et al.

(10) Patent No.: US 9,453,727 B1
(45) Date of Patent: Sep. 27, 2016

(54) NONDESTRUCTIVE DETECTION OF DIMENSIONAL CHANGES IN A SUBSTRATE USING SUBSURFACE MARKERS

(71) Applicant: Siemens Energy, Inc., Orlando, FL (US)

(72) Inventors: Gerald J. Bruck, Oviedo, FL (US); Ahmed Kamel, Orlando, FL (US); Dhafer Jouini, Orlando, FL (US); Daniel J. Ryan, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/816,152

(22) Filed: Aug. 3, 2015

(51) Int. Cl.
 *G01F 23/00* (2006.01)
 *G01B 15/06* (2006.01)
 *G01N 23/02* (2006.01)

(52) U.S. Cl.
 CPC .............. *G01B 15/06* (2013.01); *G01N 23/02* (2013.01)

(58) Field of Classification Search
 CPC .................................................. G01T 1/1648
 See application file for complete search history.

(56) References Cited

U.S. PATENT DOCUMENTS

| | | | |
|---|---|---|---|
| 6,289,141 B1 * | 9/2001 | Roseman | G07D 7/04 340/572.6 |
| 6,644,917 B2 | 11/2003 | Zhao et al. | |
| 7,052,737 B2 | 5/2006 | Kool et al. | |
| 7,883,737 B2 | 2/2011 | Mitchell et al. | |
| 8,641,845 B2 | 2/2014 | Bruck | |
| 8,746,049 B2 | 6/2014 | Willett, Jr. et al. | |
| 8,770,913 B1 | 7/2014 | Negron et al. | |
| 8,818,078 B2 | 8/2014 | Telfer et al. | |
| 2012/0180928 A1 * | 7/2012 | Bruck | B23K 1/19 156/64 |
| 2013/0136868 A1 | 5/2013 | Bruck et al. | |
| 2014/0054476 A1 * | 2/2014 | Zheng | F03D 11/0091 250/578.1 |

OTHER PUBLICATIONS

Aloke Paul, The Kirkendall Effect in Solid State Diffusion, PhD Thesis, Laboratory of Materials and Interface Chemistry, Eindhoven University of Technology, The Netherlands, 2004.

* cited by examiner

*Primary Examiner* — Kiho Kim

(57) ABSTRACT

A method, including: detecting in a nondestructive manner a marker (10, 12, 50, 70, 76, 78) that is fully submerged in a substrate (14) to obtain spatial information about the marker; detecting in a nondestructive manner the marker after a period of time to obtain a change in the spatial information; and using the change in the spatial information to determine a change in a dimension (30) of the substrate. The method may be used to measure creep in a gas turbine engine component.

20 Claims, 6 Drawing Sheets

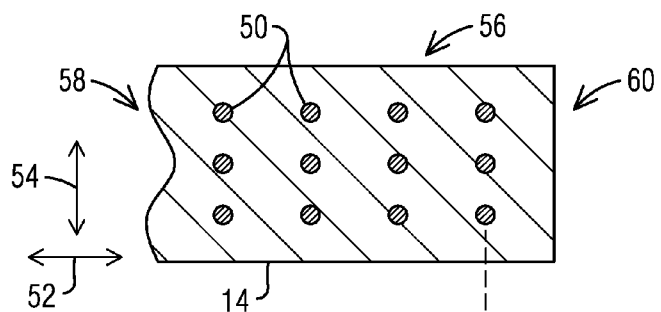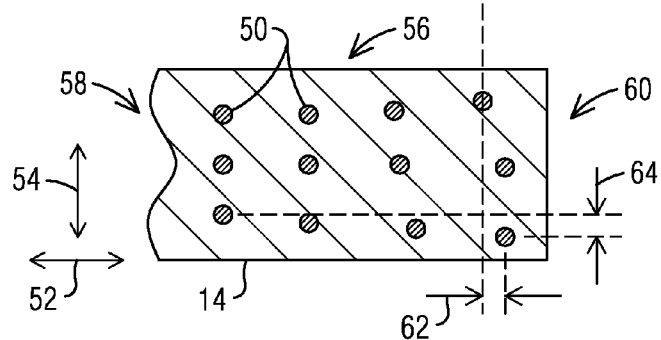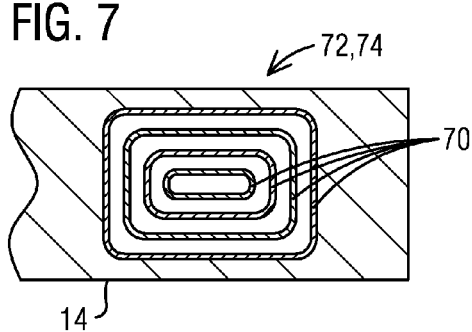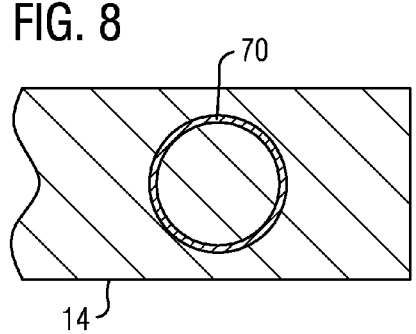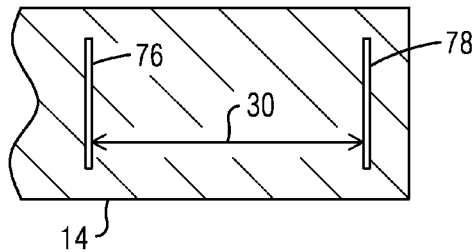

NONDESTRUCTIVE DETECTION OF DIMENSIONAL CHANGES IN A SUBSTRATE USING SUBSURFACE MARKERS

FIELD OF THE INVENTION

The present invention relates to nondestructively detecting subsurface markers to assess dimensional changes in a substrate.

BACKGROUND OF THE INVENTION

Components subject to conditions such as mechanical stress and elevated temperature are known to experience dimensional changes over a lifetime of use. For example, in the turbine section of a gas turbine engine, a rotating blade rotates at high speeds. Inertia of the airfoil portion causes mechanical stress (tension) in the span of the airfoil (from a base of the airfoil to a tip of the airfoil). This span-wise mechanical stress may cause a length of the span to increase (e.g. creep) over the life of the airfoil. In addition, it is known that a material's properties are temperature dependent, and an ability of a material to resist this creep decreases with an increase in temperature. Since turbine airfoils rotate within a flow of combustion gases at a very high temperature, the elevated temperatures contribute to the airfoil creep.

Surrounding a stage of rotating blades in a gas turbine engine is a blade ring that may include an abradable surface. This abradable surface is disposed immediately radially outward of tips of the blades. The abradable surface and the blade tips cooperatively form a seal intended to direct the combustions gases across the sides of the airfoils and not over the tip of the airfoils. Accordingly, a gap between the abradable surface and the tips of the airfoils must be controlled. It is known that periodic thermal transients may cause relative thermal growth such that the airfoil tips engage the abradable material. The abradable material is selected such that the blade tips survive by abrading the abradable material. However, this situation is not desirable and eventually may require the blade ring to be replaced due to the degraded seal.

Consequently, like many components within the gas turbine engine, the blade airfoils are constrained to operate within a certain dimensional range. For these components, this requirement exists despite the operating conditions that contribute to the change in span length of the component. Therefore, there exists a need to monitor components so that any dimensional changes can be determined and problems associated with an increase in their dimension can be avoided.

BRIEF DESCRIPTION OF THE DRAWINGS

The invention is explained in the following description in view of the drawings that show:

FIG. 5 is a schematic representation of plural markers disposed in a substrate.

FIG. 6 is a schematic representation of a change between the plural markers of FIG. 5.

FIG. 7 is a schematic representation of an alternate exemplary embodiment of markers disposed in a substrate.

FIG. 8 is a schematic representation of an alternate exemplary embodiment of a marker disposed in a substrate.

FIG. 9 is a schematic representation of an alternate exemplary embodiment of markers disposed in a substrate.

DETAILED DESCRIPTION OF THE INVENTION

The present inventors have developed an innovative method for detecting a change in a characteristic of a substrate material, such as a dimensional change in a component. Components exposed to factors that contribute to dimensional changes (e.g. creep) during operation, such as mechanical stresses and elevated temperatures, may particularly benefit. The method is nondestructive, which permits repeated testing throughout the life of the component. Specifically, a marker is disposed such that it is not visible by the naked eye to an operator handling and/or viewing the component. The marker is characterized by a property that is detectable outside of the component, typically in conjunction with a sensor. Spatial information about the marker is initially determined and associated with the component. The spatial information includes but is not limited to a location, size, and shape of the marker. The location may be taken with respect to another marker, or to a landmark of the component. After a period of time, during which the substrate/component may be subject to operation, spatial information is again determined. A difference between the spatial determinations over time can be used to evaluate a condition of the component, such as creep or stress, or indirectly to evaluate the operational conditions to which the component was exposed, along with potential changes in mechanical properties.

Figure 1:
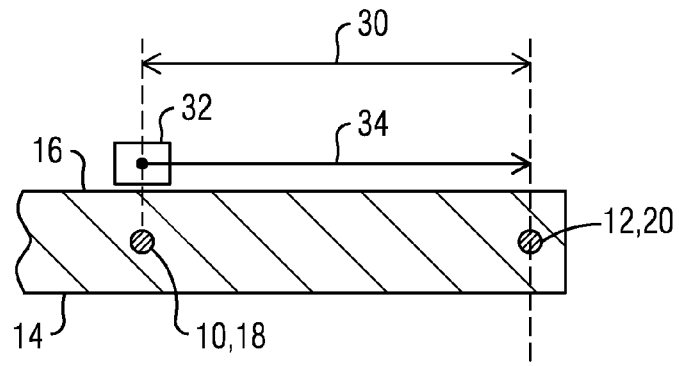
FIG. 1 is a schematic representation of an exemplary embodiment of markers disposed in a substrate.

FIG. 1 is a schematic representation of an exemplary embodiment of a first marker 10 and a second marker 12 disposed in a substrate 14. The markers 10, 12 are disposed below a surface 16 of the substrate that is visible to a technician, i.e. the markers 10, 12 are fully submerged in the substrate 14. Since the markers 10, 12 are constrained within the substrate 14, each marker is associated with a respective unique location 18, 20 in the substrate 14. Spatial information for the markers 10, 12 is gathered. In this exemplary embodiment, the spatial information includes a distance 30 between the markers 10, 12.

The distance 30 may be determined in any number of ways. In this embodiment, a sensor 32 is placed on the surface 16 and is traversed along the surface 16 to define a path 34 having a shortest distance possible between the markers 10, 12. The sensor 32 may be moved by hand. Alternately, a sensor 32 may be moved between the two markers 10, 12 along the path 34 via a mechanism such as programmed translation stage or robot (not shown). Alternately, the mechanism may move the sensor 32 along a different path (not shown) that may not remain in contact with the surface. For example, if the component is a ring and the sensors are 180 degrees apart and separated by a hole in the ring, a gantry may move the sensor 32 across the hole and in a straight line between the markers 10, 12. Whether the sensor is traversed along the surface or not, the path taken may be the shortest path (e.g. a linear path) between the markers 10, 12. In another embodiment, the path 34 may remain on a non-planar surface of a substrate to define a non-linear distance (e.g. an arcuate distance) between the markers. The same path 34 is used to determine distance 30 at two different times, thereby providing a measurement of a change in dimension of the substrate 14 over time. The change may be an increase in the dimension as a result of, for example, creep. Alternately, the change may be a decrease in the dimension. This may occur as a result of, for example, bending that may occur during service.

The markers can be positioned within the substrate at locations which optimize the detection of a particular change in the substrate of concern. For example, if creep along a particular axis is anticipated, the markers 10, 12 can be positioned near extreme ends of the axis to ensure the most accurate assessment of any dimensional change. This eliminates the need to determine the markers' spatial information with respect to another reference point that might not be aligned with the dimension of interest, potentially reducing any chance for reduced accuracy of the measurement.

Figure 2:
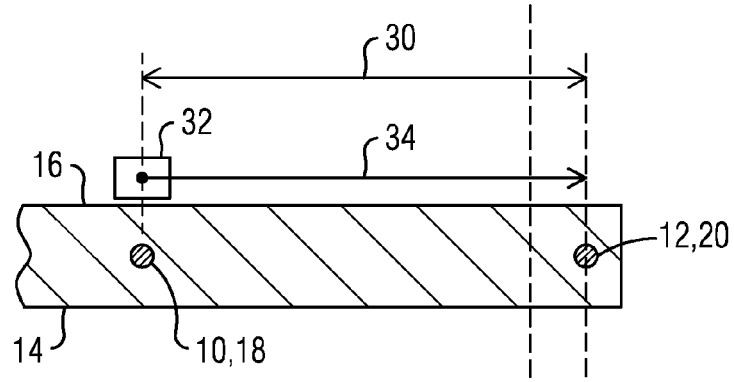
FIG. 2 is a schematic representation of a change in distance between the markers of FIG. 1.

After a period of time the spatial information is again determined, as shown in FIG. 2. If the sensor 32 was traversed along the surface 16 initially, then the sensor 32 is traversed along the surface 16 again in the shortest possible path 34 between the markers 10, 12. Likewise, if the sensor 32 was not traversed along the surface 16 initially, then the sensor 32 is again moved in the same manner as initially moved, (e.g. gantry), and in the shortest possible path 34 between the markers 10, 12. In this exemplary embodiment it can be seen that the substrate 14 has experienced creep as indicated by a movement 36 of the second marker 12 relative to the first marker 10 and a resulting increase in distance 30. This process may be repeated as often as necessary to properly characterize the change in dimension of the substrate 14 over time, or until the distance 30 exceeds a threshold.

In an alternate exemplary embodiment, instead of moving a sensor over a shortest possible path, a sensor may be positioned over the marker 10 and a position of the sensor recorded as, for example, an initial x1, y1, z1. The sensor may then be positioned over the marker 12 and its position recorded as an initial x2, y2, z2. Later in time the sensor could be positioned over the markers 10, 12 and the positions recorded again. Differences in the positioned could reveal changes in geometry over time.

Because the markers are subsurface, they are isolated from a harsh environment that may be present at the substrate surface 16, such as the hot combustion gasses in a gas turbine engine. Because subsurface structures are not visible, the markers 10, 12 may be any marker that exhibits a property that can be detected without a naked-eye observation of the markers 10, 12. For example, the property may be energy emission, including radioactivity, and the sensor may be a radioactivity sensor. In an exemplary embodiment the radioactivity includes beta and gamma radiation. A non-limiting example of a marker material that emits (by way of daughters of radioactive decay) beta and gamma radiation is thorium. A radioactive material may be a suitable marker when the substrate 14 is a metal, such as a superalloy, where other material properties such as density may make non-radioactive markers difficult to identify. Alternately, the marker may be a ferrous material (e.g. iron) when the substrate is a nonferrous material (e.g. aluminum), and the sensor may detect and/or generate an electromagnetic field or a change in an electromagnetic field associated with the ferrous marker.

The marker may be positioned on the substrate 14 and then covered by a coating to form the component. Alternately, the marker 10, 12 may be formed as the substrate is formed. For example, the substrate 14 may be cast around the marker 10, 12, or the marker 10, 12 may be formed as part of an additive manufacturing process during which the substrate 14 is formed. An example of an additive manufacturing process is disclosed in U.S. Patent Application Publication Number 2013/0136868 A1 to Bruck et al., published on May 30, 2013, which is incorporated herein by reference in its entirety. In that process, a powdered substrate material is deposited via laser deposition. A marker for the present invention may be deposited during such an additive manufacturing process using a second powdered material (e.g. thorium or thoria). The markers 10, 12 may range in size from millimeters to as small as nanoscale in some embodiments. Smaller size markers may improve the accuracy of location/distance measurements and may reduce any health concerns related to the use of a radioactive marker material.

Figure 3:
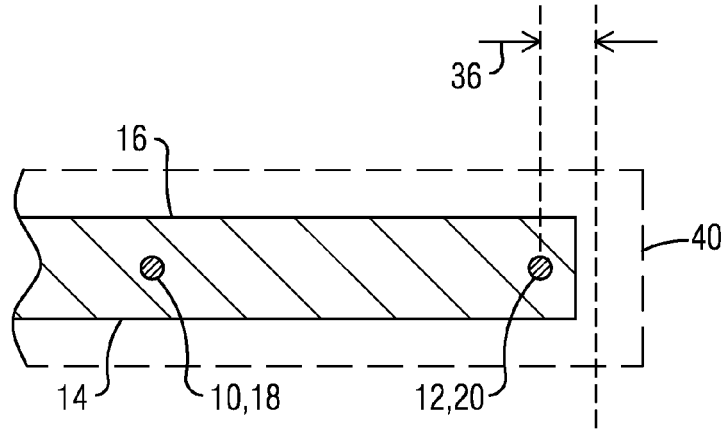
FIG. 3 is a schematic representation of an image showing the markers of FIG. 1.
Figure 4:
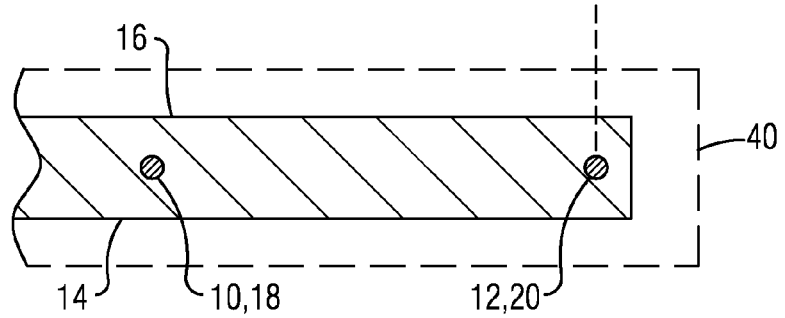
FIG. 4 is a schematic representation of an image showing the markers of FIG. 2.

As can be seen in FIG. 3, the distance 30 between the markers 10, 12 may alternately be determined by creating an image of the substrate 14. This image is of the substrate of FIG. 1 in initial form. If the markers 10, 12 include radioactive material, the image may be obtained by positioning a radiation-sensitive sheet 40 (e.g. X-ray film) of material on the substrate until the radiation-sensitive sheet registers an indication of the markers 10, 12. Alternately, an image of the substrate 14 may be projected onto a suitable sheet 40 such as via x-ray or similar process known to those in the art when the markers 10, 12 are opaque to the x-ray or other interrogating energy. After a period of time, a second image is taken in the same manner and the spatial data of the two images compared to determine any change in dimension. If the image is formed by projecting an image of the substrate 14 onto the suitable sheet 40, the orientation of the substrate 14 with respect to the suitable sheet must be the same in both images to ensure consistency in measurement. The image may be analog or digital, or initially analog and then converted to digital, etc.

FIG. 5 is a schematic representation of plural markers 50 disposed in a substrate. Having plural markers 50 improves monitoring of various dimensions along the horizontal-axis 52, the vertical-axis 54, or a combination of the two axes. For example, the plural markers may be distributed in a grid pattern 56 having known dimensions. Spatial information is obtained for each of the markers 50 using any of the techniques disclosed herein. After a period of time the spatial information is again determined, as shown in FIG. 6. It can be seen that the markers 50 toward a first end 58 of the substrate 14 moved very little or not at all, which the markers toward a second end 60 of the substrate 14 experienced horizontal movement 62 and vertical movement 64. Plural markers 50 may provide significantly more information about the condition of the substrate 14.

FIG. 7 shows an exemplary embodiment where a plurality of markers 70, each having a detectable shape, are distributed in a pattern 72, which may or may not be a concentric arrangement 74. If the shape is a quadrilateral, or a circle, a change in shape detected at a later detection would reveal a dimensional change in the substrate 14. Such an exemplary embodiment may be useful when a change in dimension can occur in any 2-dimentional direction. FIG. 8 shows an alternate exemplary embodiment where a single circular marker 70 is used.

FIG. 9 shows an exemplary embodiment where the markers 76, 78 are wires or similar elongates shapes. The installation of pre-formed wire markers 76, 78 may be preferred over the powder deposition of markers when a radioactive material is used. In addition, not only can the distance 30 between the markers 76, 78 be determined, but also, if the wire markers 76, 78 are originally installed parallel to each other, any change in the parallel relationship can be determined, as can an associated change in the substrate's dimensions.

Figure 10:
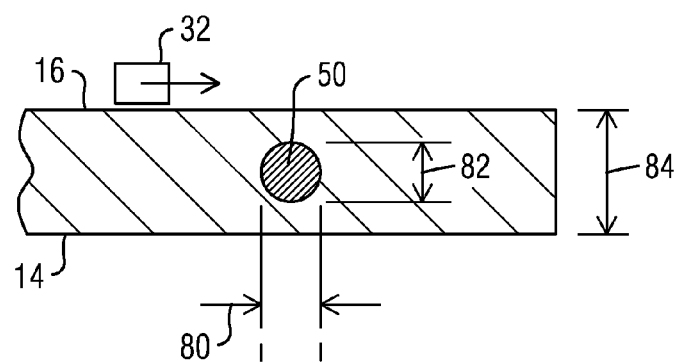
FIG. 10 is a schematic representation of an alternate exemplary embodiment of a marker disposed in a substrate.
Figure 11:
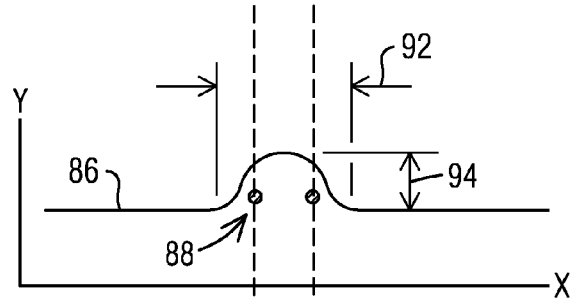
FIG. 11 shows a response curve of a sensor detecting the marker of FIG. 10.

FIG. 10 shows an exemplary embodiment where a single marker 50 is used. Here the marker 50 is situated such that the sensor 32 can detect it with ease. In an optional exemplary embodiment the marker may be more substantial in mass and/or volume. The marker may have an original width 80 and an original height 82, and the substrate may have an original thickness 84. In this exemplary embodiment, the spatial information includes information about the size and/or shape of the marker 50 itself to indicate a change in the thickness of the substrate 14. Specifically, as shown in FIG. 11, as the sensor 32 crosses over the marker 50 the sensor 32 generates a profile 86 having a density profile 88 that indicates the presence of the marker 50. The density profile 88 itself has an original length 92 and an original height 94 (e.g. an amplitude).

Figure 12:
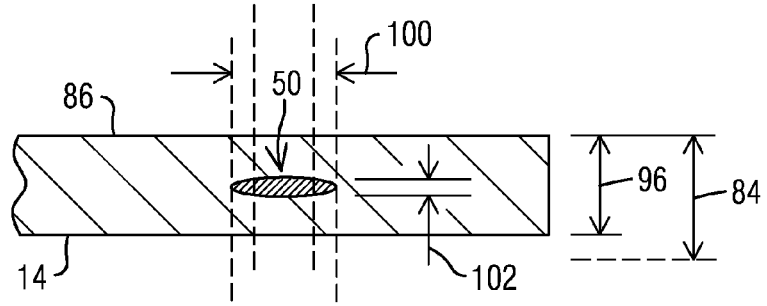
FIG. 12 is a schematic representation of a change in the marker of FIG. 10.
Figure 13:
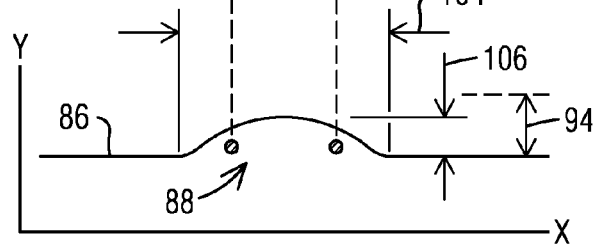
FIG. 13 shows a response curve of a sensor detecting the marker of FIG. 12.

As shown in FIG. 12, after a period of time the substrate 14 may exhibit a reduced thickness 96. This thinning of the substrate 14 may, in turn, stretch the marker 50 to an increased width 100 and a reduced height 102. As shown in FIG. 13, during the subsequent detection the sensor 32 may return a profile 86 with a density profile 88 having an increased length 104 and a decreased height 106. Accordingly, a change in the profile 86 can indicate a change in thickness of a substrate. Substrates 14 such as pipes and/or walls of pressure vessels etc. may be monitored in this manner.

Figure 14:
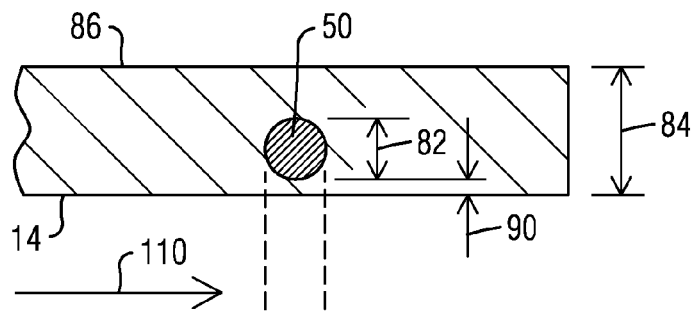
FIG. 14 is a schematic representation of an alternate exemplary embodiment of a marker disposed in a substrate.
Figure 15:
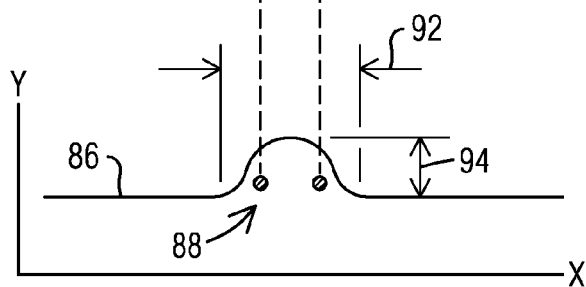
FIG. 15 shows a response curve of a sensor detecting the marker of FIG. 14.
Figure 16:
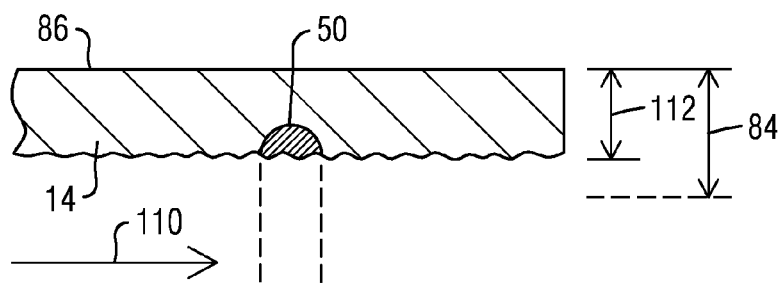
FIG. 16 is a schematic representation of a change in the marker of FIG. 14.
Figure 17:
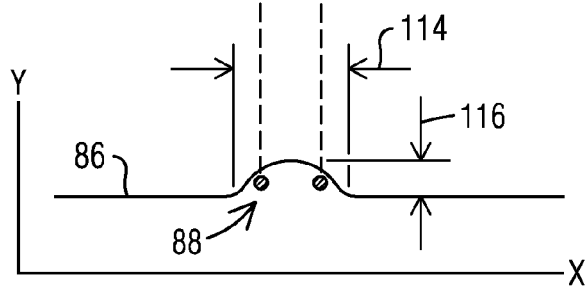
FIG. 17 shows a response curve of a sensor detecting the marker of FIG. 16.

FIG. 14 shows an exemplary embodiment of the marker 50 disposed in the substrate 14. Similar to FIG. 10 the marker 50 exhibits the original height 82 and the substrate the original thickness 84 and be disposed at an original distance 90 from the surface 16. The substrate 14 may contain a flow 110 of hot gases and/or otherwise may be subject to a corrosive environment. As with FIG. 11, the sensor 32 generates a profile 86 having a density profile 88 that indicates the presence of the marker 50 as seen in FIG. 15. The density profile 88 itself has an original length 92 and an original height 94. FIG. 16 shows the substrate 14 and the marker 50 of FIG. 14 after experiencing corrosion/deterioration and associated loss. What remains is a substrate having a reduced thickness 112 and a deteriorated marker 50 having reduced volume. As shown in FIG. 17, during the subsequent detection, the sensor 32 will return a profile 86 having a density profile 88 with a reduced length 114 and/or a reduced height 116. Accordingly, the subsequent scan will reveal the loss of the marker 50 and an associated loss of the substrate material.

Figure 18:
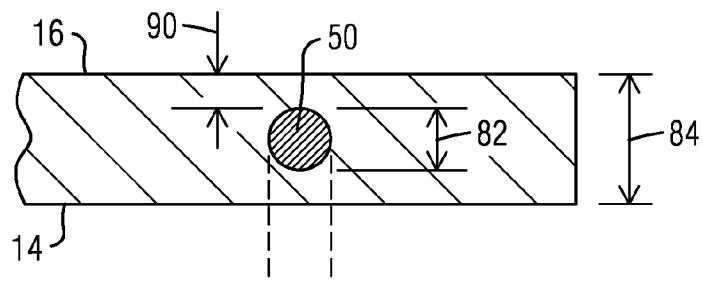
FIG. 18 is a schematic representation of an alternate exemplary embodiment of a marker disposed in a substrate.
Figure 19:
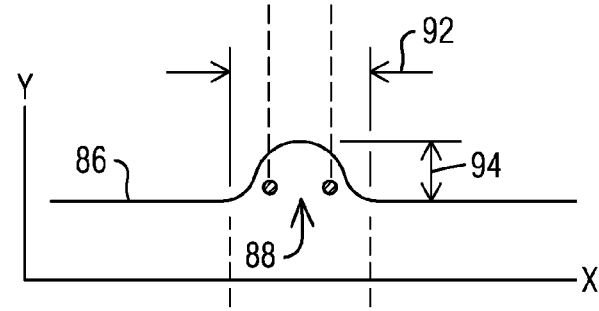
FIG. 19 shows a response curve of a sensor detecting the marker of FIG. 18.
Figure 20:
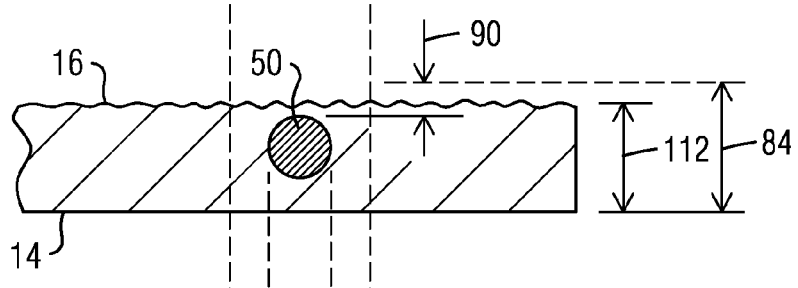
FIG. 20 is a schematic representation of a change in the marker of FIG. 18.
Figure 21:
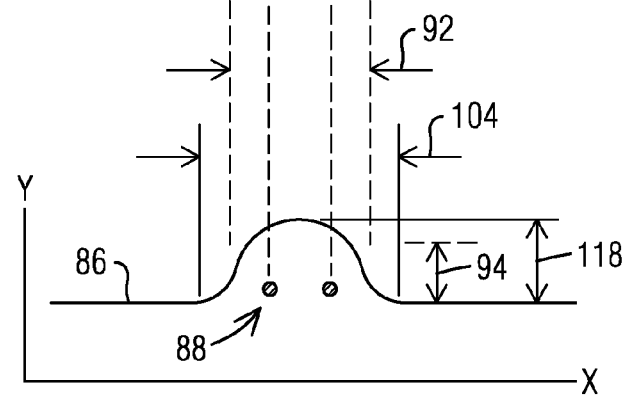
FIG. 21 shows a response curve of a sensor detecting the marker of FIG. 20.

FIG. 18 shows an exemplary embodiment of the marker 50 disposed in the substrate 14. Similar to FIG. 14 the substrate exhibits an original thickness 84 and the marker 50 is disposed at an original distance 90 from the surface 16. The surface 16 of the substrate 14 may be subject to erosion, corrosion, or any similar material loss. As seen in FIG. 19 the sensor 32 generates a profile 86 having a density profile 88 that indicates the presence of the marker 50. The density profile 88 itself has an original length 92 and an original height 94. FIG. 20 shows the substrate 14 and the marker 50 of FIG. 14 after the surface 16 of the substrate 14 experiences corrosion/deterioration and associated loss. What remains is a substrate 14 having a reduced thickness 112 where the marker 50 is closer to the surface 16 of the substrate. As shown in FIG. 21, during the subsequent detection, the sensor 32 will return a profile 86 having a density profile 88 with at least one of an increased length 104 and an increased height 118 due to the closer proximity of the marker 50 to the sensor 32. Accordingly, the subsequent scan will reveal the loss of the substrate material at the surface 16.

Figure 22:
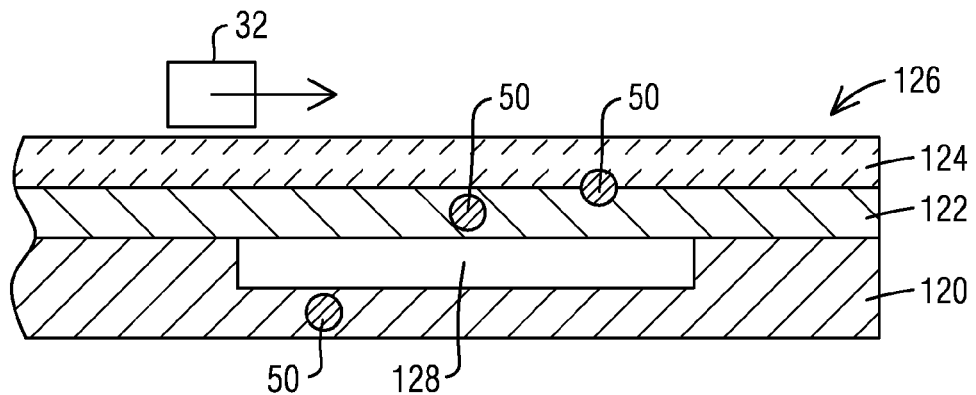
FIG. 22 is a schematic representation of alternate exemplary embodiments of markers disposed in a substrate.

While the exemplary embodiments disclosed so far have generically referred to a substrate 14, it is understood that the term substrate may refer to a base material that is subsequently coated, or it may refer generally to the coating and the base material together. For example, as shown in FIG. 22, the marker 50 may be disposed in any or all of a metallic superalloy 120, a bond coat 122, and/or a thermal barrier coating 124 of a component 126. Alternately, or in addition, the marker 50 may be disposed under a void 128 such as a cooling channel.

Figure 23:
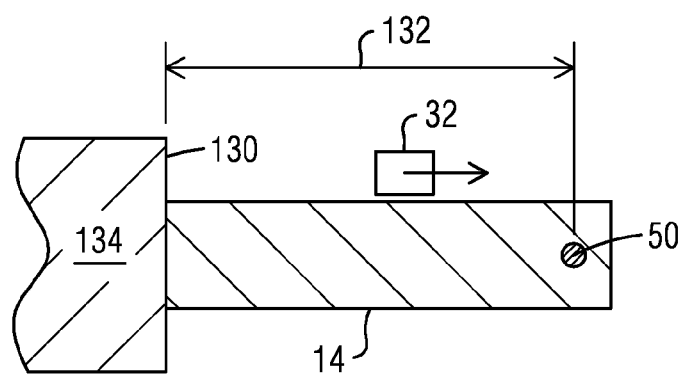
FIG. 23 is a schematic representation of an alternate exemplary embodiment of a marker disposed in a substrate.

In an exemplary embodiment, instead of having two markers 10, 12, a single marker 50 is disposed in the substrate 14 as can be seen in FIG. 23. A landmark 130 may be chosen to which the distance 132 to the marker 50 is measured. The landmark 130 may be, for example, the surface of a blade platform 134. Landmarks 130 that are expected to experience little creep may be chosen. For example, the blade platform 134 may be selected because only a portion of it is exposed to elevated temperatures, and also because it is relatively close to a base (not shown) of the blade and so any creep experienced by the platform would be negligible in absolute terms. When measured against such a relatively fixed landmark, a relatively accurate measurement of the creep may be obtained.

From the foregoing it can be seen that the present inventors have devised a way to measure dimensional changes in a part without harming the part. The material disclosed here is relatively straight forward and takes advantage of existing technologies, making it relatively inexpensive to implement. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method, comprising:
   detecting in a nondestructive manner a marker that is fully submerged in a substrate to obtain spatial information about the marker;
   detecting in a nondestructive manner the marker after a period of time to obtain a change in the spatial information; and
   using the change in the spatial information to determine a characteristic of the substrate.

2. The method of claim 1, wherein the marker comprises a marker material that emits energy, the method further comprising detecting the energy.

3. The method of claim 1, further comprising detecting in a nondestructive manner a plurality of markers, each fully submerged in the substrate and at a unique location, and wherein the spatial information comprises distances between the plurality of markers.

4. The method of claim 3, wherein the plurality of markers are distributed in a predetermined pattern.

5. A method, comprising:
   associating a visually undetectable marker with a substrate;
   detecting a property of the visually undetectable marker from outside of the substrate to determine spatial information associated with the visually undetectable marker;
   detecting the property from outside of the substrate again at a later time to determine a change in the spatial information; and
   using the change in the spatial information to determine a condition.

6. The method of claim 5, wherein the visually undetectable marker comprises a radioactive material, the method further comprising detecting radiation from the radioactive material.

7. The method of claim 6, wherein the radioactive material comprises thorium or thoria.

8. The method of claim 5, wherein the visually undetectable marker comprises iron and the substrate is not magnetic, the method further comprising creating a magnetic field and detecting a change in the magnetic field caused by the iron.

9. The method of claim 5, wherein the visually undetectable marker comprises a detectable shape, the method further comprising detecting a change in the shape to determine a dimensional change in the substrate.

10. The method of claim 5, wherein the method further comprises identifying a land-mark on the substrate, and wherein the spatial information comprises a distance from the land-mark to the visually undetectable marker.

11. The method of claim 10, wherein the landmark is a second visually undetectable marker that exhibits the same property, the method further comprising detecting the second visually undetectable marker from outside the substrate.

12. The method of claim 5, further comprising capturing the spatial information in digital images and comparing the digital images to determine the dimensional change.

13. The method of claim 5, wherein the spatial information comprises a density profile of the visually undetectable marker.

14. The method of claim 13, wherein the change in the spatial information comprises a change in a peak of the density profile and the change in dimension comprises at least one of a thinning of the substrate and a loss of substrate material.

15. The method of claim 5, further comprising associating a plurality of visually undetectable markers with the substrate in a pattern, detecting respective properties, and wherein the spatial information comprises distances between the plurality of visually undetectable markers.

16. The method of claim 15, wherein the pattern comprises a grid of visually undetectable markers or concentrically positioned visually undetectable markers.

17. A method, comprising:
   associating a first visually undetectable marker with a first location on a substrate;
   associating a second visually undetectable marker with a second location on the substrate;
   monitoring a spatial relationship between the first visually undetectable marker and the second visually undetectable marker over time; and
   using a change in the spatial relationship over time to determine a dimensional change between the first location and the second location.

18. The method of claim 17, wherein the method comprises moving a sensor on a surface of the substrate along a shortest possible path between the first visually undetectable marker and the second visually undetectable marker to detect the first visually undetectable marker and the second visually undetectable marker, and wherein the change in the spatial relationship comprises a change in a length of the shortest possible path.

19. The method of claim 17, further comprising generating a digital image showing a linear path between the first visually undetectable marker and the second visually undetectable marker, and wherein the change in the spatial relationship comprises a change in a length of the linear path.

20. The method of claim 17, wherein the first visually undetectable marker comprises a straight wire, and wherein the second visually undetectable marker comprises a straight wire disposed parallel to the first visually undetectable marker, and wherein the change in the spatial relationship comprises a change in a shortest distance between the wires.

* * * * *